Patented May 26, 1942

2,284,100

UNITED STATES PATENT OFFICE 2,284,100

NONFIBROUS FILMS

Frederick M. Meigs, Niagara Falls, N. Y., assignor to E. I. du Pont de Nemours & Company, Wilmington, Del., a corporation of Delaware No Drawing. Application May 27, 1937,
Serial No. 145,151

20 Claims. (Cl. 260—27)

This invention relates to thin, self-sustaining pellicles of polyvinyl alcohol suitable for use as wrapping material. It relates particularly to such pellicles containing a wax or wax-like material and which are clear, transparent, flexible, non-tacky and preferably moistureproof. More particularly, the invention relates to moistureproof polyvinyl alcohol wrapping tissues.

In recent years there have been put on the market in large quantities non-fibrous sheets and films made from various types of materials, such as certain resins, regenerated cellulose, cellulose derivatives and others. These materials have found extensive use both as wrapping tissue and for other purposes. One of the most recently developed of these materials has been polyvinyl alcohol, which is characterized by several unique properties. It is extremely tough, flexible and transparent and has a very high elongation. On the other hand, it is sensitive to water and permeable to the passage of water vapor. In order to overcome these and other disadvantages, it has been suggested to add various modifying ingredients to polyvinyl alcohol compositions. Most of the ingredients hitherto added, however, do not form homogeneous mixtures capable of being cast into transparent, clear articles and/or do not secure the proper modifying effect that is desired, such as an increased resistance to water or increased resistance to the passage of water vapor therethrough.

One of the ingredients that it has been sought to add to polyvinyl alcohol compositions is a wax or a wax-like material since the inclusion of such a material, if effected in the proper manner, in the proper quantity and in a proper relationship with other ingredients of the composition is known to contribute moistureproofness to pellicles cast therefrom. The problem of securing a composition containing both polyvinyl alcohol and wax in water is peculiarly difficult because of the known high incompatibility of water and wax, and the incompatibility of polyvinyl alcohol and wax. Nevertheless, one of the greatest advantages of polyvinyl alcohol is its ability to be cast directly from water solution.

It is therefore an object of the present invention to provide a transparent polyvinyl alcohol self-sustaining sheeting which may be used successfully for wrapping cigars, cigarettes, or other articles in preventing ingress or egress of moisture during exposure, prior to consumption.

Another object of the invention is to provide a modified polyvinyl alcohol wrapping tissue which is relatively thin, transparent, flexible, non-greasy and preferably moistureproof.

A further object is to formulate compositions of polyvinyl alcohol, modified with wax or wax-like materials, that may be converted directly to relatively thin, transparent, flexible, non-greasy, preferably moistureproof sheeting.

Other objects will appear hereinafter.

The objects of this invention are accomplished in general by casting an aqueous mixture consisting of polyvinyl alcohol, a plasticizer, a moistureproofing agent, and a resin soluble in basic solution serving as a blending agent. Surprisingly, it has been found that such sheeting, although cast from an aqueous solution, is not only transparent, but also relatively moistureproof.

Throughout the following specification and claims, the term "moistureproof" is to be understood as falling within the following definition:—

Moistureproof materials are defined as those which, in the form of continuous, unbroken sheets or films, permit the passage of not more than 690 grams of water vapor per 100 square meters per hour, over a period of 24 hours, at approximately $39.5°\pm0.5°$ C., the relative humidity of the atmosphere on one side of the film being maintained at least at 98% and the relative humidity of the atmosphere on the other side being maintained at such a value as to give a humidity differential of at least 95%.

For the purposes of experimental tests in the determination of moistureproofness as it applies to the product of the instant invention, a polyvinyl alcohol pellicle having a thickness of approximately 0.001" (not more than 0.005") is exposed at a temperature of $39.5°\pm0.5°$ C. (preferably $39.5°$ C.$\pm0.25°$ C.) so that one side is in contact with a humid atmosphere and the other side is in contact with a relatively arid atmosphere, the water vapor pressure differential being 50–55 mm. (preferably $53.4\pm0.7$ mm.) of mercury. For convenience, the number of grams of water vapor passing per 100 square meters per hour, over a period of 24 hours, under these conditions may be referred to as the "permeability value" of the pellicle. Obviously, the greater the degree of moistureproofness, the lower will be the permeability value. Ordinarily pellicles of polyvinyl alcohol, which are useful as wrapping tissues, show a permeability value of the order of 6500.

In accordance with this invention, it has been found that wax-containing, preferably moistureproof polyvinyl alcohol sheeting may be cast from basic solutions in which acidic blending agents and preferably also acidic plasticizers are dissolved as their salts, such as ammonium salts, and containing a wax or other moistureproofing agent dispersed therein. Modified rosin is preferably employed as the blending agent. Under certain conditions it may, if desired, be replaced in whole or in part by rosin, or hydrogenated rosin, or the like. As a plasticizer it is preferred to use those which are soluble in basic solutions in the form of their salts, but insoluble in water and particularly higher alcohol half esters of dicarboxylic acids, such as monododecyl acid phthalate, monohexadecyl acid phthalate, monooctadecyl acid succinate, monohexadecyl acid adipate and the monododecyl or monooctadecyl ester of condensation products of maleic anhydride and alpha-terpinene, such as are described and claimed in U. S. Letters Patent to Peterson et al. No. 1,993,025. These blending agents and/or plasticizers are preferably dissolved in the form of their ammonium salts since these can be made water insoluble by driving off ammonia by means of the heat applied during drying. Amine salts such as methylamine, ethanolamine, for example, may be used but are less desirable because they remain water soluble after drying and are not very compatible with waxes. In addition to these ingredients, there may be added, if desired, agents to facilitate the stripping of the film from the casting support, such as ammonium salts of higher fatty acids, for example, ammonium stearate or ammonium palmitate.

Instead of the above basic soluble plasticizers there may, if desired, be substituted in whole or in part ordinary moistureproofing plasticizers such as dibutyl phthalate, tricresyl phosphate and the like. Under these conditions, of course, the plasticizer must be present in the form of a dispersion rather than a solution, and is customarily dispersed with the wax.

As the moistureproofing agent, it has been found preferable to use a wax or wax-like substance and particularly one of rather high melting point. Paraffin waxes of higher or lower melting point may be used, depending upon the degree of moistureproofness and/or the surface characteristics desired. Other waxes such as Montan wax, carnauba wax and ozocerite may also be employed. Thus, a mixture of Montan wax and paraffin wax will aid in securing good surface characteristics. Other materials, such as those described and claimed in the Charch, Brubaker and Meigs U. S. Patents 2,098,534 through 2,098,542 may be used. These moistureproofing agents, of course, are not soluble in water and must be dispersed in the composition. In doing this, in order to secure good moistureproofness and transparency, care must be taken to see that the size of the wax particles is kept small. It has been found, for example, that the average size of the wax particles should be below 4 microns in diameter and preferably between 0.5 and 2 microns in diameter, or even less in size. This particle size may be achieved in any desired fashion, such as by grinding the film-forming dispersion in a colloid mill.

The polyvinyl alcohol employed as the base in the present invention is preferably in a concentration of between 10 and 20% of the film-forming solution. The polyvinyl alcohol may be of almost any viscosity, for example 15 to 75 centipoises, and preferably having a viscosity of approximately 18 to 40 centipoises in 4% solution at 20° C. Likewise, the polyvinyl alcohol may be unsubstituted, or may be one in which the hydroxyl groups have been substituted to a certain degree with acetyl and/or ester groups, provided the so substituted polyvinyl alcohol is still water soluble.

The proportion of the ingredients in the sheeting of the invention may be varied somewhat. Thus, the amount of polyvinyl alcohol in the sheeting may be varied within a fairly wide range, although it is generally preferred to operate within the range of 70–90%. Generally, the blending agent is present in the sheeting in the quantity of 10–25%, but this is altered in accordance with the specific composition being employed and the degree of incompatibility encountered between the ingredients of the composition. Generally, the plasticizer is present in the relatively moistureproof polyvinyl alcohol sheeting in amounts between 4.5 and 12.0%, but again, the amount varies with the specific composition and the specific nature of the plasticizers chosen. Usually, the wax is preferably present in a concentration of approximately 3–4.5%. It will, of course, be recognized that if a high degree of clarity and transparency is desired, the lower limits for the wax will be used, whereas, if moistureproofness is the prime consideration and transparency of only slight moment, the quantity of wax will be correspondingly increased. For a transparent sheeting, the particle size of the wax should be in the range of 4 to 0.5 microns and for especially good transparency, the wax particles should preferably be 2 to 0.5 microns or less in size.

The moistureproofing polyvinyl alcohol composition of the invention obviously can be modified, if desired, by the addition of pigments such as titanium dioxide, water soluble modifiers such as dyes, urea, plasticizers for polyvinyl alcohol such as ethylene glycol, glycerol, sugars and the like, etc.

Having described the film-forming compositions generally, the following specific example will now be given:

Example

A mixture of 3 grams of paraffin wax (melting point 61–63° C.), 10 grams of the modified rosin described and defined in Morton U. S. Patent No. 2,017,866, and 6 grams of monododecyl phthalate is melted at 120° C. and stirred until a clear melt is obtained. To this melt at a temperature of 85–95° C., is added slowly with stirring 10 cc. of concentrated ammonium hydroxide. This is approximately four times the theoretical amount of ammonia necessary to neutralize the modified rosin and monododecyl phthalate, but much of it is lost by evaporation during its addition. The mixture is diluted with water until the total weight is 100 grams and is then passed through a colloid mill at 65–75° C. until the particle size of the dispersed wax has been reduced to less than 1.5 microns. After the dispersion has cooled to room temperature and the foam has been removed, the dispersion is added to a solution of 80 grams of polyvinyl alcohol in 480 grams of water. This mixture is stirred until uniform and then allowed to stand until the bubbles have disappeared, when it is ready for casting into sheets or films.

Sheeting prepared from the above composition and formed into a film by the method hereinafter described is found to have a moisture permeability value of 250–275.

The above described compositions can be formed into film by methods well known to the art. In this connection, the following detailed description is given of a preferred method by which this may be carried out.

The composition is delivered by means of a metering pump to a casting hopper, which is maintained at a temperature substantially equal to that of the casting composition, for example about 80–95° C. By means of the hopper, a thin layer of the composition is deposited on the highly polished surface of a casting wheel or continuous band or belt as the latter revolves, the layer being smoothed to a uniform thickness by a doctor knife, which latter may, if desired, be one of the edges of the hopper. The wheel or belt surface is maintained at a temperature of about 80°–95° C.

As an alternative for the deposition of a uniform layer of casting composition on the surface, the hopper may be provided with a pair of adjustable hopper lips, which together form an extrusion orifice in the shape of an elongated slit. By adjusting the width of the slit, a given, predetermined amount of casting composition will be extruded in a sheet-like form and will be deposited as such on the casting surface, which advances at the same speed as the linear extrusion speed of the film-forming composition.

The hopper is preferably located in a casting chamber in which the atmosphere is quiescent and is maintained at a temperature of about 80–95° C. The advancing surface, together with the deposited layer of film-forming composition, emerges from the casting chamber into a drying chamber. Air passing through the drying chamber at a temperature of about 80–110° C., or higher, facilitates removal of the water from the composition. After a period of 1–10 minutes, depending on the various factors involved, such as velocity and temperature of the drying air, thickness of the desired pellicle, concentration of the film-forming composition, etc., sufficient water has been removed to permit the pellicle being stripped from the casting surface. After stripping, the film is carried over suitable rolls to a conditioning chamber through which air is passed at a suitably elevated temperature to effect substantially complete removal of the water and to develop the moistureproof properties of the pellicles to the highest degree. The pellicle is led from the casting chamber over one or more cooling rolls, after which it may be wound on to a suitable core or mandrel, or optionally it may be cut off at predetermined intervals to produce a "cut-to-size" sheeted stock.

In practicing the above described method, the solids concentration (including plasticizers) of the casting composition, the distance of the doctoring edge of the hopper or the doctor knife, as the case may be, from the casting surface, the amount of composition metered to the hopper, and the speed of travel of the casting surface should all be so controlled that the pellicle will have the desired thickness which, in the case of a wrapping material, should be less than 0.005", and preferably less than 0.002".

In order to produce clear, transparent, nontacky, flexible, moistureproof pellicles, it is essential that the pellicles be cast and dried at a temperature at least equivalent to the melting point of the wax, and, if the highest degree of moistureproofness is desired, the pellicle should at some time during the manufacture be submitted to a temperature higher than the melting point of the wax moistureproofing agent in the composition. Appropriate conditions can be obtained by having the casting surface at or above the crystallization point of the wax while the drying air is somewhat above or below this temperature, although in no case should the temperature of the air be so low that the surface of the composition layer is chilled to a point below the crystallization point of the wax. Optionally, the casting surface may be somewhat below the crystallization point of the wax, provided the air temperature is above the wax crystallization point, but here again, the temperature of the casting surface must never be reduced so low as to induce crystallization of the wax from the composition.

The maintenance of these proper temperature conditions is important to successful operation of the invention. If the temperature of the thin layer of composition is permitted to fall very low before substantially all of the water has been removed, there is danger of wax crystallization. Even though mass crystallization of the wax is substantially avoided, there is still danger of wax crystallization on the surface of the layer, thereby inhibiting the evaporation of the remaining solvents, in which case continuous casting becomes impractical while the pellicle will frequently be blushed and/or hazy. As noted above, the atmosphere of the casting chamber is maintained at such a temperature as to heat the composition quickly as it exudes from the hopper or at least prevent any cooling effect before the layer passes into the drying chamber.

Substantially all the water must be removed from the pellicle before it is wound into a final roll. Most of the water solvent, of course, is removed in the drying chamber while the residual water is removed in the conditioning chamber. It is, in fact, preferable that a small amount of water remain in the pellicle when it is stripped from the casting surface so as to equalize to a certain extent the differences in characteristics of the opposite surfaces of the pellicle. It is at this point that the pellicle can be most conveniently submitted to a temperature equal to or higher than the melting point of the wax to develop moistureproofness to the highest degree.

After conditioning, the pellicle is cooled before being wound into rolls or otherwise collected. This is done to prevent wrinkling, shrinking, sticking of adjacent sheets, or the like. The cooling may be accomplished as above described by means of a cooling roll or the pellicle may be led through a chamber through which cold air is passed, or cold air blasts may be directed against the film by suitable jets or nozzles.

As will be readily understood by those skilled in the art, the polyvinyl alcohol, the blending agent, the plasticizer, and the wax constitute the "total solids" of a composition, even though one or more of them may be normally liquid.

In wrapping cigars, cigarettes, and like articles which lose moisture by exposure to the atmosphere and in which it is desired to retain this moisture, the relatively moistureproof polyvinyl alcohol sheeting of the invention is preferably applied in such a fashion that the side of the sheet which is next to the casting surface during casting becomes the exterior side of the wrapped package. The conditions should be reversed in wrapping materials which gain moisture by exposure to the atmosphere and in which it is desired to prevent such absorption.

The invention renders possible the production of inherently moistureproof polyvinyl alcohol pellicles in a continuous, economical manner, which obviously has many advantages over moistureproofing by a coating operation with its repeated handlings and attendant difficulties. By furnishing a simple procedure of producing a relatively transparent and preferably moistureproof polyvinyl alcohol sheeting, the invention should materially widen the scope of commercial application of the relatively tough and elastic polyvinyl alcohol sheeting.

The term "modified rosin" as used throughout the present specification and claims, is defined as the rosin described and claimed in U. S. Letters Patent to Morton, No. 2,017,866. The term "wax" is intended to include both true waxes and wax-like materials such as paraffin.

While the invention has been described as produced by continuous casting, it can, of course, be effected by discontinuous casting or casting on a plate.

Obviously, many other changes and modifications can be made in the specific details set forth above without departing from the nature and spirit of the invention. The invention is therefore not to be restricted to the above details except as set forth in the appended claims.

I claim:

1. A flowable aqueous solution containing polyvinyl alcohol, a wax, a plasticizer, and a basic soluble blending agent comprising modified rosin.

2. A moistureproof transparent self-sustaining polyvinyl alcohol film comprising polyvinyl alcohol, 3% to 4.5% paraffin wax, 4.5% to 12% plasticizer and 10% to 25% of basic soluble blending agent taken from the class consisting of modified rosin, rosin and hydrogenated rosin.

3. A moistureproof transparent selfsustaining polyvinyl alcohol film comprising polyvinyl alcohol, 3% to 4.5% wax, 4.5% to 12% plasticizer and 10% to 25% of modified rosin.

4. A moistureproof transparent self-sustaining polyvinyl alcohol film comprising polyvinyl alcohol, 3% to 4.5% wax, 4.5% to 12% of plasticizer consisting of higher alcohol half ester of dicarboxylic acid and 10% to 25% of basic soluble blending agent taken from the class consisting of modified rosin, rosin and hydrogenated rosin.

5. A moistureproof transparent self-sustaining polyvinyl alcohol film comprising polyvinyl alcohol, 3% to 4.5% wax, 4.5% to 12% of plasticizer consisting of higher alcohol half ester of dicarboxylic acid and 10% to 25% of modified rosin.

6. A moistureproof transparent self-sustaining polyvinyl alcohol film consisting of 80 parts polyvinyl alcohol, 3 parts paraffin wax, 6 parts mono-dodecyl phthalate and 10 parts modified rosin.

7. A flowable aqueous casting solution containing as the essential solids polyvinyl alcohol, 3% to 4.5% wax, 4.5% to 12% plasticizer consisting of the ammonium salt of mono-dodecyl phthalate, and 10% to 25% of the ammonium salt of modified rosin, said percentages being based on the total solids in the solution.

8. A homogeneous moistureproof transparent self-sustaining film less than 0.005 inch thick comprising essentially polyvinyl alcohol, 3% to 4.5% wax, 4.5% to 12% plasticizer and 10% to 25% of basic soluble blending agent from the group consisting of modified rosin, rosin and hydrogenated rosin.

9. A flowable dry casting aqueous solution containing as the essential solids polyvinyl alcohol, 3% to 4.5% wax, 4.5% to 12% plasticizer, and 10% to 25% basic soluble blending agent taken from the class consisting of modified rosin, rosin and hydrogenated rosin, said percentages being based on the total solids in the solution.

10. A flowable aqueous solution containing polyvinyl alcohol, a wax, a plasticizer and basic soluble blending agent comprising rosin.

11. A flowable aqueous solution containing polyvinyl alcohol, a wax, a plasticizer and basic soluble blending agent taken from the class consisting of modified rosin, rosin and hydrogenated rosin.

12. An ammonium hydroxide neutralized aqueous solution containing polyvinyl alcohol, wax, plasticizer and basic soluble blending agent comprising modified rosin.

13. A flowable dry casting aqueous basic solution containing as the essential solids polyvinyl alcohol, 3% to 4.5% wax, 4.5% to 12% plasticizer, and 10% to 25% basic soluble blending agent taken from the class consisting of modified rosin, rosin and hydrogenated rosin, said percentages being based on the total solids in the solution, and the wax being present in particles of less than 4 microns in diameter.

14. A flowable dry casting aqueous basic solution containing as the essential solids polyvinyl alcohol, 3% to 4.5% wax, 4.5% to 12% plasticizer, and 10% to 25% basic soluble blending agent taken from the class consisting of modified rosin, rosin and hydrogenated rosin, said percentages being based on the total solids in the solution, and the wax being present in particles of 0.5 to 2.0 microns in diameter.

15. A moistureproof, transparent, self-sustaining film comprising polyvinyl alcohol containing embodied therein a wax, a plasticizer, and basic soluble blending agent selected from the class consisting of modified rosin, rosin and hydrogenated rosin.

16. A moistureproof, transparent, self-sustaining film comprising polyvinyl alcohol containing embodied therein a wax, a plasticizer and modified rosin.

17. A homogeneous moistureproof transparent self-sustaining film less than 0.005 inch thick comprising essentially polyvinyl alcohol, 3% to 4.5% wax, 4.5% to 12% plasticizer and 10% to 25% of modified rosin.

18. An ammonium hydroxide neutralized aqueous solution containing polyvinyl alcohol, wax, plasticizer and basic soluble blending agent selected from the class consisting of modified rosin, rosin and hydrogenated rosin.

19. A flowable dry casting aqueous basic solution containing as the essential solids polyvinyl alcohol, 3% to 4.5% wax, 4.5% to 12% plasticizer, and 10% to 25% modified rosin, said percentages being based on the total solids in the solution, and the wax being present in particles of 0.5 to 2.0 microns in diameter.

20. A flowable dry casting aqueous basic solution containing as the essential solids polyvinyl alcohol, 3% to 4.5% wax, 4.5% to 12% plasticizer, and 10% to 25% modified rosin, said percentages being based on the total solids in the solution, and the wax being present in particles of less than 4 microns in diameter.

FREDERICK M. MEIGS.